United States Patent
Seglin et al.

[15] 3,655,331
[45] *Apr. 11, 1972

[54] PRODUCTION OF SODIUM CARBONATE

[72] Inventors: Leonard Seglin, New York, N.Y.; Henry S. Winnicki, New Canaan, Conn.

[73] Assignee: Intermountain Research & Development Corporation, Cheyenne, Wyo.

[ * ] Notice: The portion of the term of this patent subsequent to May 5, 1981, has been disclaimed.

[22] Filed: June 6, 1969

[21] Appl. No.: 835,878

Related U.S. Application Data

[63] Continuation of Ser. No. 356,880, Apr. 2, 1964, abandoned, which is a continuation-in-part of Ser. No. 72,145, Nov. 28, 1960, Pat. No. 3,131,996, which is a continuation-in-part of Ser. No. 632,236, Jan. 2, 1957, Pat. No. 2,962,348.

[52] U.S. Cl. ........................................... 23/63, 23/38, 23/302
[51] Int. Cl. ........................................................ C01d 7/00
[58] Field of Search ............................. 23/31, 38, 63, 302

[56] References Cited

UNITED STATES PATENTS

| | | | |
|---|---|---|---|
| 1,907,987 | 5/1933 | Lynn | 23/63 |
| 2,343,081 | 2/1944 | Pike | 23/63 |
| 2,639,217 | 5/1953 | Pike | 23/63 |
| 2,704,239 | 3/1955 | Pike | 23/63 |
| 2,770,524 | 11/1956 | Seaton et al. | 23/63 X |
| 2,792,282 | 5/1957 | Pike | 23/63 |
| 2,798,790 | 7/1957 | Pike | 23/63 |
| 2,962,348 | 11/1960 | Seglin et al. | 23/31 |
| 3,131,996 | 5/1964 | Seglin et al. | 23/63 |
| 3,211,519 | 10/1965 | Roberts et al. | 23/63 |
| 3,245,755 | 4/1966 | Comer et al. | 23/63 |
| 3,260,567 | 7/1966 | Hellmers et al. | 23/63 |
| 2,962,348 | 11/1960 | Seglin et al. | 23/63 |
| 3,269,567 | 7/1966 | Hellmers et al. | 23/63 |

OTHER PUBLICATIONS

Garrett, Chemical Engineering Progress, " Industrial Crystallization at Trona," Vol. 54, No. 12, Dec. (1958), pp. 65–69.
The Condensed Chemical Dictionary, Sixth Edition, Reinhold Publishing Corp., 1961, page 198.

*Primary Examiner*—Earl C. Thomas
*Assistant Examiner*—G. O. Peters
*Attorney*—Hammond & Littell, Milton Zucher and Eugene S. Seems

[57] ABSTRACT

A process for preparing refined soda ash from crude trona by calcining the crude trona to crude sodium carbonate, mixing the crude sodium carbonate with an aqueous solution containing at least 6 percent of sodium carbonate to form a saturated solution of sodium carbonate, separating the solution from the gangue solids, evaporating the solution to crystallize sodium carbonate therefrom, separating the sodium carbonate crystals and calcining to soda ash.

15 Claims, 7 Drawing Figures

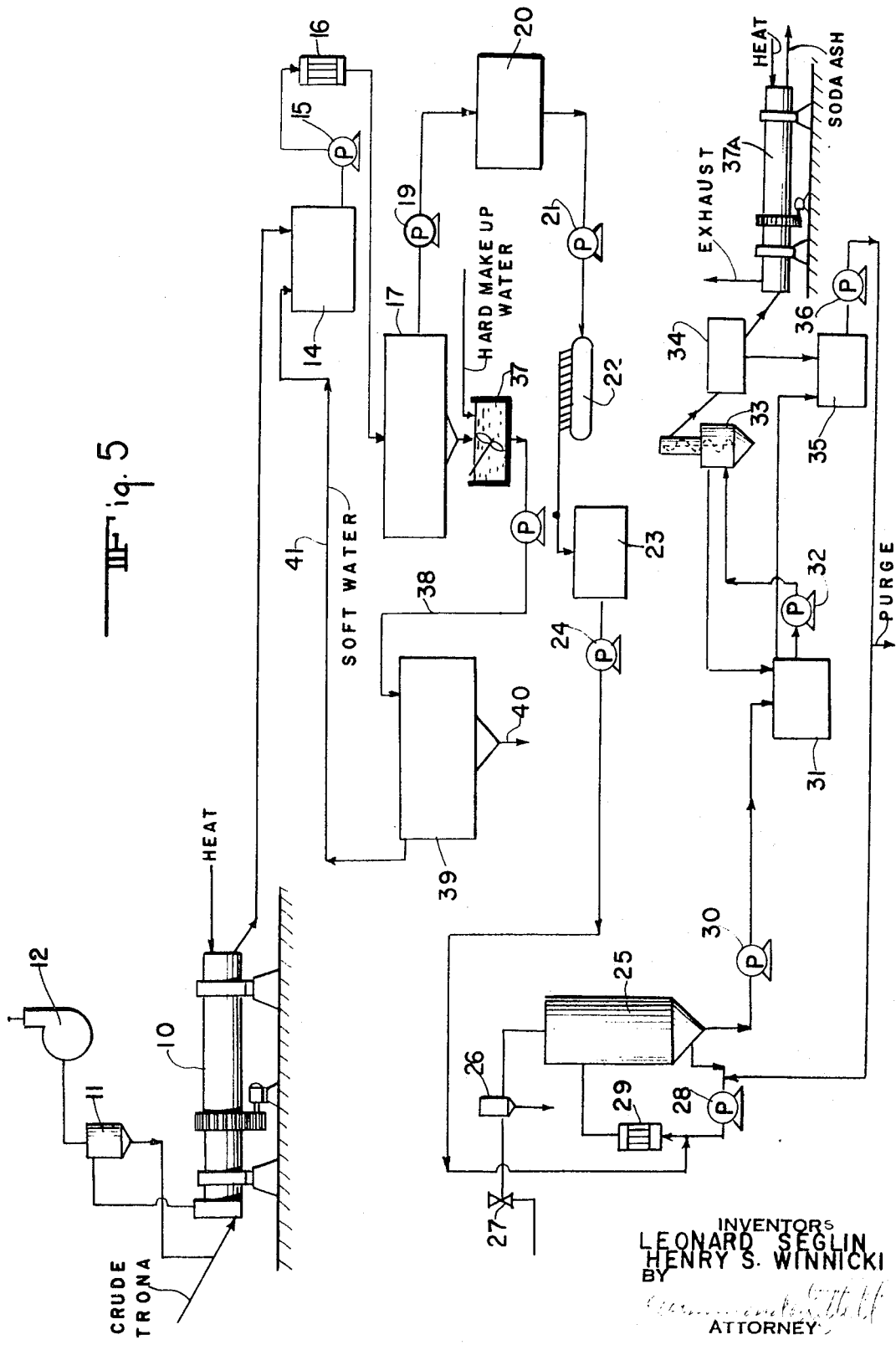

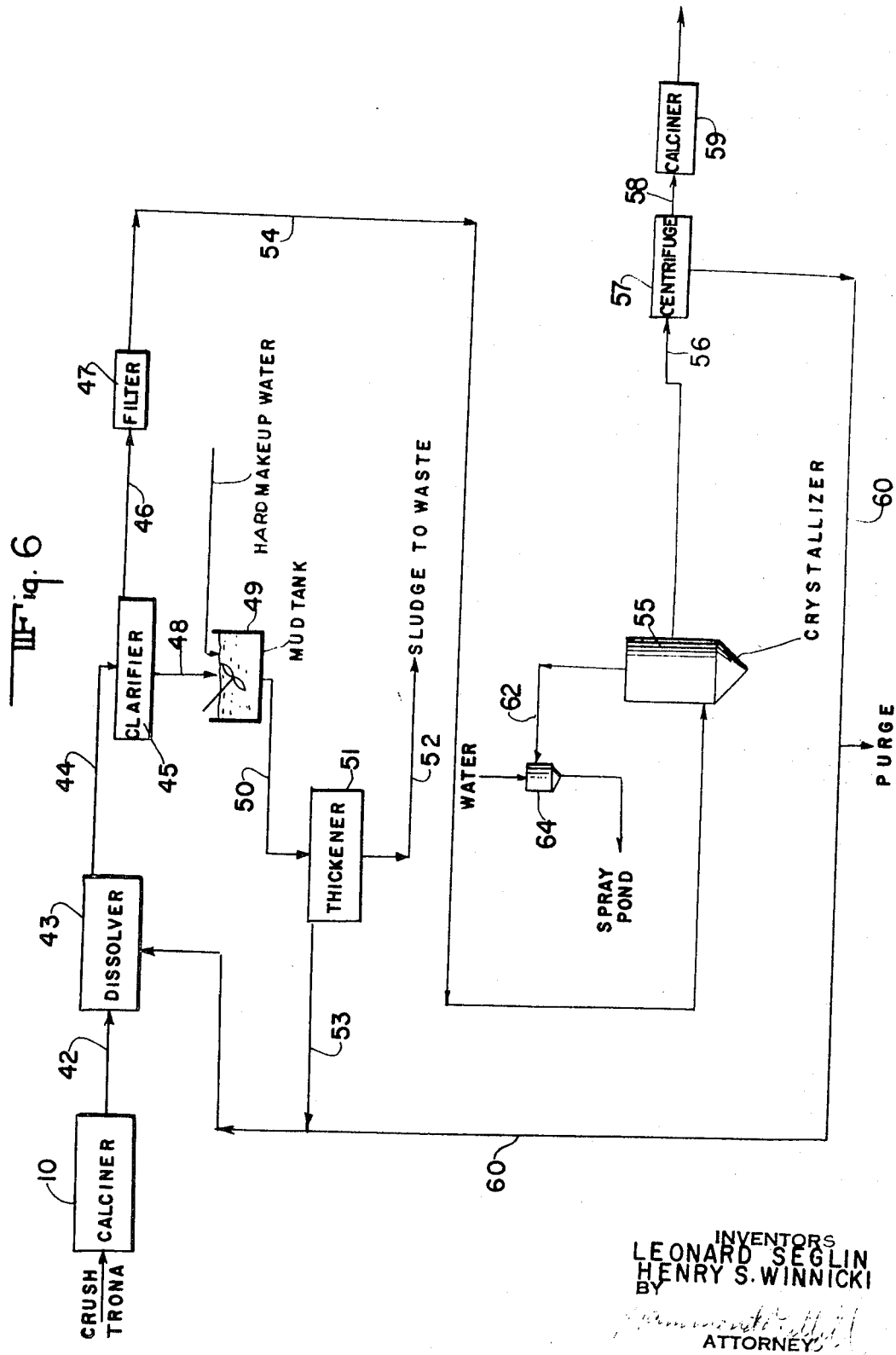

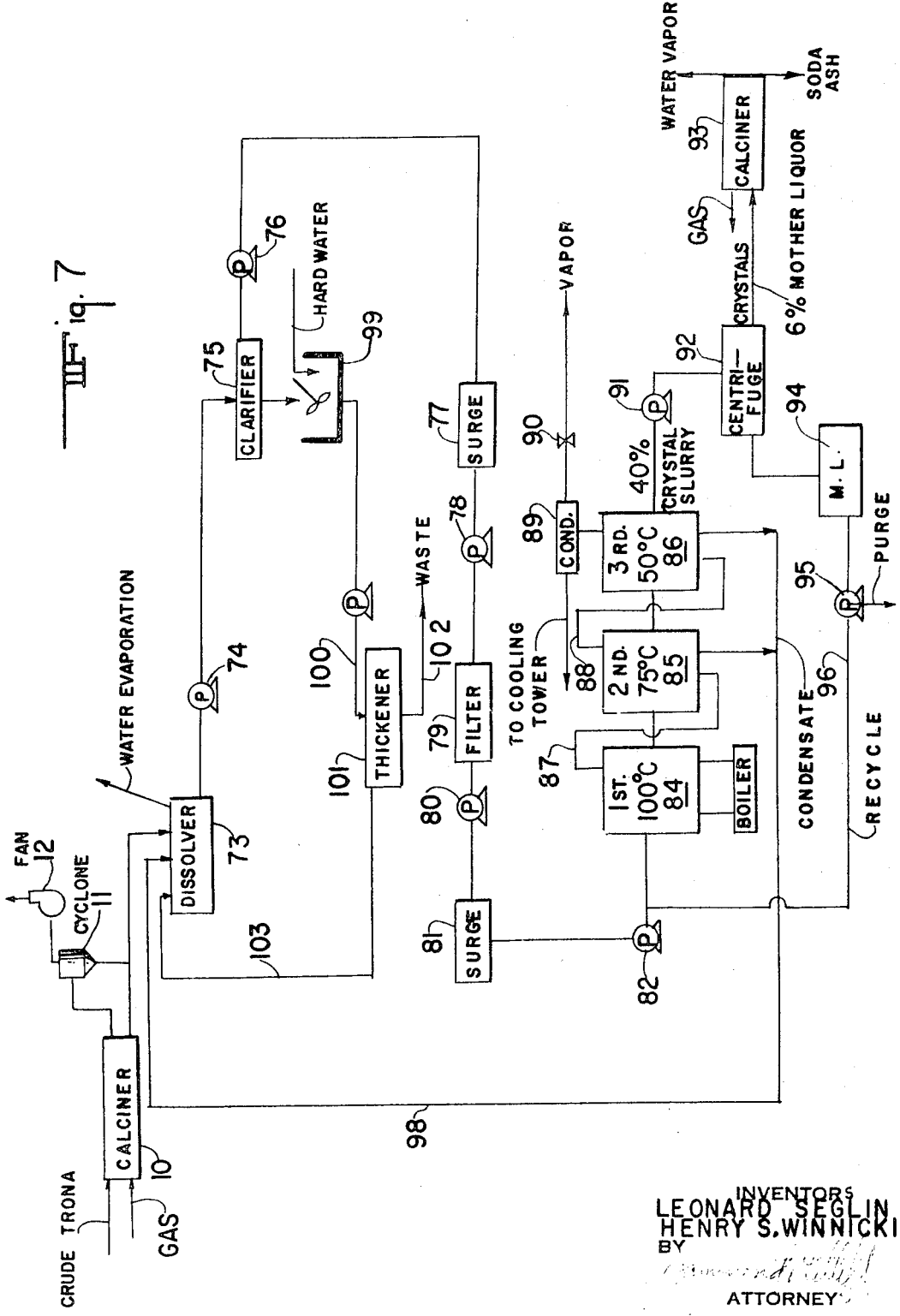

PRODUCTION OF SODIUM CARBONATE

This application is a continuation of application Ser. No. 356,880 filed Apr. 2, 1964, now abandoned, which is a continuation-in-part of our copending application Ser. No. 72,145, filed Nov. 28, 1960, now U.S. Pat. No. 3,131,996, which application was a continuation-in-part of application Ser. No. 632,236 filed Jan. 2, 1957, now U.S. Pat. No. 2,962,348.

This invention relates to an improved process for the production of sodium carbonate from crude trona.

In Sweetwater and adjacent counties in the vicinity of Green River, Wyoming, trona deposits are found at depths ranging from about 800 to 1,800 feet underground. The main trona bed varies from 8 to 18 feet in thickness and other beds of less thickness separated by layers of shale are usually found above the main trona bed. The trona consists mainly of sodium sesquicarbonate ($Na_2CO_3 \cdot NaHCO_3 \cdot 2H_2O$) and 4 to 6 percent insoluble materials consisting mainly of shale. A typical analysis of the crude trona from which the larger pieces of shale have been removed is

| Constituent | Percent |
|---|---|
| $Na_2CO_3$ | 43.51 |
| $NaHCO_3$ | 36.11 |
| $H_2O$ | 13.14 |
| $Na_2SO_4$ | 0.02 |
| NaCl | 0.08 |
| $Fe_2O_3$ | 0.14 |
| Organic matter | 0.30 |
| Insolubles | 6.70 |

The insoluble fraction contains some calcareous mineral such as limestone and shortite from which, given sufficient time, calcium will dissolve to give a solution containing about 50 ppm of calcium (130 ppm total hardness). However, in the dissolving process hereinafter described, as the solutions become more concentrated in sodium carbonate, calcium carbonate will precipitate to provide plant solutions containing about 97 ppm total hardness calculated as $CaCO_3$ when the solution contains about 31 percent $Na_2CO_3$ at the boiling point which is about 95° C.

The prior art method of processing the crude trona into soda ash comprises dissolving the crude trona in a mother liquor containing excess carbonate over bicarbonate, clarifying and filtering the solution of dissolved trona, passing the filtrate to a vacuum crystallization step wherein sodium sesquicarbonate crystallizes as the stable crystal phase, separating the crystals from the mother liquor, calcining the sesquicarbonate crystals to convert the same to soda ash and recirculating the mother liquor to dissolve more crude trona. The prior art process is complicated by the presence of organic material in the soda ash derived from the organic material in the crude trona or the shale with which it is found and from organic surface active agents added to the prior art process to improved crystallization.

These disadvantages have been largely overcome by the novel process disclosed in our U.S. Pat. No. 2,962,348. The process of our prior applications comprises calcining the crude trona to form crude sodium carbonate and optionally remove the organics therefrom, dissolving the said crude sodium carbonate in an aqueous solvent, which may contain some sodium carbonate dissolved therein, clarifying the resulting crude sodium carbonate solution, adding mother liquor to the clarified solution, crystallizing sodium carbonate monohydrate therefrom, preferably in evaporative crystallizers, calcining the monohydrate crystals to produce dense, organic-free soda ash, and re-cycling the mother liquor from the crystals to the evaporating step. The mother liquor is purged before reentering the system to the extent necessary to prevent undesirable buildup of chlorides and sulfates in the evaporator circuit.

The process of said prior application Ser. No. 632,236, however, is not completely free from disadvantages. During the operation, large amounts of water must be added to the system to dissolve the crude sodium carbonate, even if the water from the evaporators is condensed and recycled to the dissolvers. Water is lost during the condensation step, through purge of some of the mother liquor, leaks, evaporation from the equipment, water in and on the crystals produced, etc. Generally, an average amount of makeup water that has to be added to a recycling system producing 100,000 tons of dense soda ash per year is about 120 gallons per minute or over 200,000 gallons per day, and even if a part of this water is condensate from the evaporators and therefore already softened, a large amount of raw water must be added to the system.

The natural waters of the region, for example, water from the Green River, have an average hardness of about 270 ppm, calculated as calcium carbonate, whereas calcium carbonate is soluble in concentrated sodium carbonate solutions only to a much more limited extent, namely about 97 ppm in a 31 percent $Na_2CO_3$ solution at 95° C., so that if the natural waters of the region are added directly to the dissolvers used for dissolving the crude sodium carbonate, a large amount of calcium carbonate is precipitated in the system, and, for example, pirssonite, a complex of sodium and calcium carbonate having the formula $Na_2CO_3 \cdot CaCO_3 \cdot 2H_2O$ is formed which tends to deposit on the plant equipment. It deposits in the heat exchangers, pumps and lines leading to and from the dissolver, treating tanks, filter and crystallizer feed pumps and lines, circulating pumps and water condensers, and is particularly heavy in zones of high turbulence such as pumps and in areas where increases in temperature occur.

The pirssonite scale is a compact, crystalline mass varying in thickness from a thin film to a ¼ inch thick film or more, which adheres very tightly to all exposed surfaces on which it deposits. The scale causes pitting and corrosion of the equipment, clogging of piping, and breakdown of moving parts such as in the pumps. Because of its hardness, the scale cannot easily be removed by mechanical means. An inhibited acid may be used to descale the equipment, but the inhibited acid also promotes corrosion of the equipment. Also, the removal of the pirssonite scale requires loss of production time as the process must be stopped before using inhibited acid solutions or before mechanical removal of the scale. The calcium carbonate also deposits with the sodium carbonate monohydrate crystals produced in the evaporators and thereby contaminates the final soda ash. When shortite, $Na_2CO_3 \cdot 2CaCO_3$ is dissolved from the crude trona and precipitated as pirssonite, one molecule of shortite provides the calcium required to form two molecules of pirssonite.

The calcium, forming the pirssonite scale and depositing with the soda ash is introduced into the system when hard makeup water containing calcium in excess of the calcium solubility of the system is added directly into the circulating sodium carbonate solutions in the plant. The makeup water is obtained from natural sources, such as rivers or wells, which water normally has a high degree of hardness, or it may be obtained from plant ponds or lakes in which process water from the plant has been stored. The hardness of the natural river water of the region varies some with the season of the year, but it averages about 270 ppm total hardness calculated as calcium carbonate and is usually in excess of 230 ppm at all seasons of the year. About one-third of the total hardness is present as magnesium carbonate and the remainder is calcium carbonate. On the basis of 150 gallons per minute of makeup water added to the system, about 300 pounds per day of calcium carbonate is introduced into the system. Where part of the makeup water for dissolving the crude calcined trona is obtained by condensation of the vapors from evaporative crystallizers, the amount of raw water is proportionately reduced, but nevertheless is a source from which large amounts of calcium may be introduced into the system.

One of the objects of this invention is to provide a process for preparing dense, organic free soda ash of reduced calcium contamination from crude trona.

Another object of this invention is to provide a process for the preparation of soda ash from crude trona with a shortened time cycle and increased production rate over that of the prior art.

Another object of this invention is to provide a simple, economical process for the production of dense soda ash from crude trona without calcium incrustations forming in the process equipment and with reduced calcium contamination of the product.

Another object of this invention is to provide a process for production of sodium carbonate monohydrate whereby sodium values in the muds discharged from the clarifiers are recovered.

A further object of the invention is to provide for the use of softened or partially softened water for dissolving sodium carbonate from crude calcined trona in the manufacture of refined soda ash therefrom.

A further object is to soften the hard makeup water used to dissolve the calcined crude trona by mixing the water with the insoluble muds from the clarifier carrying some residual sodium values therein and separating the softened water from the insoluble muds in a separator wherein calcium carbonate precipitated from the hard water is discharged from the dissolving system with the insoluble muds and the now softened water recovered for use in the process.

Another object of the invention is to provide dissolving water containing sufficient sodium carbonate previously dissolved therein to reduce the solubility of shortite and other calcium containing minerals from calcined crude trona in the dissolving solution.

Another object of the invention is to provide dissolving liquors with sufficiently low calcium content to avoid precipitation of calcium carbonate during the period of contact with calcined crude trona, containing sodium carbonate and calcarious material such as dolomite and shortite, in the dissolvers and during the subsequent processing steps prior to evaporation.

Another object is to provide improved conditions for the crystallization of sodium carbonate monohydrate from the evaporation solutions whereby crystals improved in size and shape are produced.

Various other objects and advantages of this invention will become apparent from the following detailed description.

The preferred process of this invention comprises crushing the crude trona, calcining the crude trona to form crude sodium carbonate and optionally to remove organic materials, dissolving the crude sodium carbonate in an aqueous solution, softened to a hardness of less than 130 ppm, total hardness, calculated as $CaCO_3$, and containing at least 6.2 percent of sodium carbonate dissolved therein, clarifying and/or filtering the resulting solution to remove insoluble materials as muds or gangue, separating the muds or gangue, crystallizing sodium carbonate monohydrate from the clarified solution preferably in multiple effect evaporative crystallizers, calcining the monohydrate crystals to produce dense organic free soda ash, and using the muds separated from the solution to soften and add sodium carbonate to the water introduced into the process. Other processes of softening the makeup and dissolving water introduced into the process, and of recovering sodium carbonate from the solution may, however, be used.

In the process of the present invention crude trona is processed to crude sodium carbonate by calcining and converting the sodium sesquicarbonate present in the crude trona to sodium carbonate. This reaction may be presented as follows:

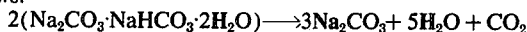

$$2(Na_2CO_3 \cdot NaHCO_3 \cdot 2H_2O) \rightarrow 3Na_2CO_3 + 5H_2O + CO_2$$

The crude dry-mined trona may be prepared for calcination by crushing the mined trona and passing it over a screening device or other suitable separating equipment, whereby particles in the general size range smaller than 1 inch are collected and passed to the calciner. Rejected oversize particles may then be recycled to the crushing apparatus for further crushing and screening. Proper sizing of the crude trona insures good decomposition of the organics and good conversion of the sodium sesquicarbonate to sodium carbonate, since oversized particles are not easily converted in the calciner.

The calcination of the crude trona has several advantages. First, by calcining between temperatures of about 400°–800° C., the organic matter present in the crude trona may be substantially removed as it is converted to a less soluble state where it is removed in the dissolving and clarifying process. Secondly, the calcination effects a conversion of the bicarbonate present in the crude trona to sodium carbonate. Third, the calcium and other difficulty soluble material in the insoluble fraction is rendered still less soluble, and lastly, the crude sodium carbonate resulting from the calcination has a greater rate of solubility than the crude trona. A comparison of the solubility rates, under batch conditions, is set forth in Table I.

TABLE I

% $Na_2CO_3$ in Solution

| Time, minutes | Crude Trona | Crude Sodium Carbonate |
|---|---|---|
| 1 | 13 | 31.5 |
| 2 | 17 | 32.5 |
| 3 | 18.5 | 32.5 |
| 5 | 19 | 32.0 |

The increase in the rate of solubility results in shorter dissolving time and in a great saving in the dissolving equipment size so that large production rates of soda ash can be obtained in smaller vessels. Additionally, the shorter dissolving time results in less dissolving of the calcium carbonate present in the insoluble fraction of the trona.

The calcination may be carried out at temperatures between about 400° to 800° C. While lower calcination temperatures may be employed to convert the bicarbonate values to normal carbonate, say 150° to 350° C., if carbon treatment or other steps to remove organic matter are used, it is necessary that temperatures of about 400° to 800° C. be employed in order to remove the organic matter present in the crude trona in the calcining operation if no other organic removal steps are to be used in later processing of the sodium carbonate solutions. The upper limit is about 800° C. due to the fact that impure sodium carbonate will begin to fuse at temperatures above 800° C. A temperature between 500°–550° C. is preferred.

A rotary, direct fired calciner may be used, although other type kilns, such as vertical kilns or grate type calciners, are equally suitable.

The retention time of the crude trona in the calciner is a function of the ore particle size and the temperature of the calciner, and at a temperature of 500° to 550° C., a period of about 15 minutes has been found satisfactory.

After the crude trona is calcined, it is passed to the dissolving area where softened or partially softened water containing 6.2 percent or more of dissolved sodium carbonate therein, is used to form an aqueous solution of the sodium carbonate values in said calcined crude trona. The hot sodium carbonate plus the heat of solution may heat the solution above the boiling point so that steam is formed and escapes from the dissolvers used in the dissolving system thereby requiring more water than that theoretically required for solution of the crude sodium carbonate. If the water is softened to less than 130 ppm total hardness, calculated as calcium carbonate, it may dissolve some calcium from the crude calcined trona, but the limit of solubility of calcium in a saturated solution of sodium carbonate at about 95° C. is about 97 ppm, calculated as calcium carbonate. If the water contains substantially more than 170 ppm total hardness, a large amount of calcium carbonate will be precipitated in the dissolvers thereby creating the problems of scale formation described previously.

When anhydrous sodium carbonate or calcined crude trona is introduced into water or into a solution of sodium carbonate in water at a temperature above 95° F. (35° C.) and below 230° F. (110° C) it hydrates to sodium carbonate monohydrate. If the solution is unsaturated the sodium carbonate monohydrate dissolves. If the solution is saturated the sodium carbonate monohydrate does not dissolve.

The effluent from the dissolvers which, in our preferred process, is a substantially saturated solution of sodium carbonate, plus suspended insolubles, which may contain undissolved sodium carbonate monohydrate therein is then passed to a clarifier where the insolubles settle out.

If a small amount of solid matter remains suspended in the liquor after passing the carbonate solution through the clarifier, the liquors may be filtered to remove the remaining insolubles.

The overflow liquors from the clarifier, pregnant with sodium carbonate, are then passed to the evaporating and crystallizing area.

By the use of softened or partially softened water in the process, the problem of excessive calcium contamination of the product and of incrustation in the equipment with subsequent corrosion and pitting thereof is overcome. By the use of water containing 6 percent or more of sodium carbonate previously dissolved therein, the decomposition of shortite from the calcined trona is minimized. The hard natural water may, of course, be softened by the use of any of the commercial water softening systems such as a cold lime-soda softening process or ion exchange system, or by mixing with soft water condensed from the vapors of evaporative crystallizers or softened in other ways, but softening of the additional hard makeup water by the use of the muds normally discharged from the process is more economical and more satisfactory.

In the cold-lime soda process calcium hydroxide and soda ash are added to the water to remove the calcium and magnesium values according to the following equations:

(1) 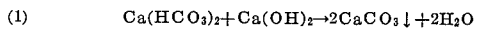
$$Ca(HCO_3)_2 + Ca(OH)_2 \rightarrow 2CaCO_3\downarrow + 2H_2O$$

(2) 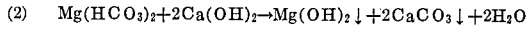
$$Mg(HCO_3)_2 + 2Ca(OH)_2 \rightarrow Mg(OH)_2\downarrow + 2CaCO_3\downarrow + 2H_2O$$

(3) 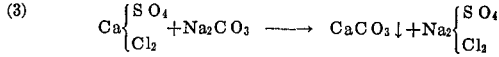
$$Ca\begin{Bmatrix}SO_4\\Cl_2\end{Bmatrix} + Na_2CO_3 \longrightarrow CaCO_3\downarrow + Na_2\begin{Bmatrix}SO_4\\Cl_2\end{Bmatrix}$$

(4) 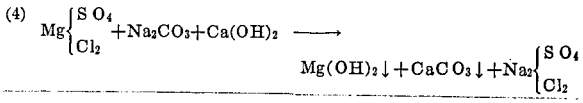
$$Mg\begin{Bmatrix}SO_4\\Cl_2\end{Bmatrix} + Na_2CO_3 + Ca(OH)_2 \longrightarrow Mg(OH)_2\downarrow + CaCO_3\downarrow + Na_2\begin{Bmatrix}SO_4\\Cl_2\end{Bmatrix}$$

The cold lime-soda process will reduce the total hardness of the water to below 68 ppm of hardness with about 35 ppm of said hardness being calcium.

The lime-zeolite process works similarly to the cold lime-soda process. The calcium and magnesium present as carbonate hardness is removed according to equation (1) and (2) and the calcium and magnesium present as non-carbonate hardness is exchanged and removed by the zeolites. With this process, the hardness is reduced to practically zero. However, the equipment costs are twice the cost for the cold lime-soda process. Distillation per se is also an expensive method of water softening but a certain amount of distillate can be recovered from the evaporative crystallizers used in our process to supply partially the soft water requirements of the process or to mix with the natural hard waters of the region to reduce their total hardness.

Our preferred method of softening the hard water of the region comprises mixing the insoluble muds containing the calcined crude trona insolubles, as well as any undissolved sodium carbonate monohydrate with the natural hard water of the region and separating the muds and the water in a thickener whereby the water is softened, and sodium values are recovered from the muds, the precipitated calcium is removed from the system in the muds discharged to waste, and the softened water is cycled to the dissolvers. In this manner, a substantial amount of sodium values in the insolubles from the dissolver solution is recovered and the cost of erecting, maintaining and operating a separate water softening system is eliminated.

As shown by Examples I and III hereof, when using natural water of the region, the amount of pre-dissolved sodium carbonate in liquor flowing into the dissolvers is respectively 6.28 percent and 7.95 percent and as shown by Example III about one-third of the sodium carbonate in the muds consists of undissolved sodium carbonate monohydrate, which is dissolved in the mud washing operation while most of the remainder of the sodium carbonate solution associated with the muds is also recovered. If the makeup water is obtained from plant ponds or lakes in which process water from the plant has been stored, or from waste plant streams, it may already contain several percent of sodium carbonate and will increase the amount of sodium carbonate in the dissolver water, above that shown in Examples I and III, by the amount of sodium carbonate contained in the plant pond or lake water or waste plant streams.

The hardness of the water from the thickener is of the same magnitude as that obtained from a cold lime-soda softening process. For example, when river water having a total hardness of about 255 ppm (155 ppm calcium carbonate hardness and 100 ppm magnesium carbonate hardness) is mixed with the muds from the clarifiers and the muds settled and removed from the system in a thickener, the hardness of the thickener overflow water is reduced to below 56 ppm total hardness and in a plant producing 100,000 tons per year of dense soda ash over 10,000 tons per year of sodium carbonate is recovered from the clarified muds. For these reasons we consider the trona-mud water softening process described in greater detail herein as far superior to other water softening methods in the soda-ash process described and claimed herein.

The softened makeup water may be used alone in dissolving the sodium carbonate from the crude calcined trona or it may be mixed with condensate from the evaporative crystallizers or with recycle mother liquor or with softened process water from plant storage ponds, or with distilled water or softened water produced in any way to provide a solvent having hardness of less than 130 ppm for dissolving the crude calcium carbonate.

Referring now to the drawings:

FIG. 5 illustrates diagrammatically one embodiment of the process for the production of soda ash from calcined trona in which mother liquor is recycled to the evaporators to which the filtered solution of sodium carbonate is fed for crystallization;

FIG. 6 illustrates diagrammatically another embodiment of the process for the production of soda ash from calcined trona in which mother liquor is recycled to the dissolvers, and FIG. 7 illustrates a further modification of the process in which condensate from two stages of a three stage evaporative crystallizer system is recycled to the dissolvers and mixed with softened makeup water, to dissolve more sodium carbonate.

Figure 1:
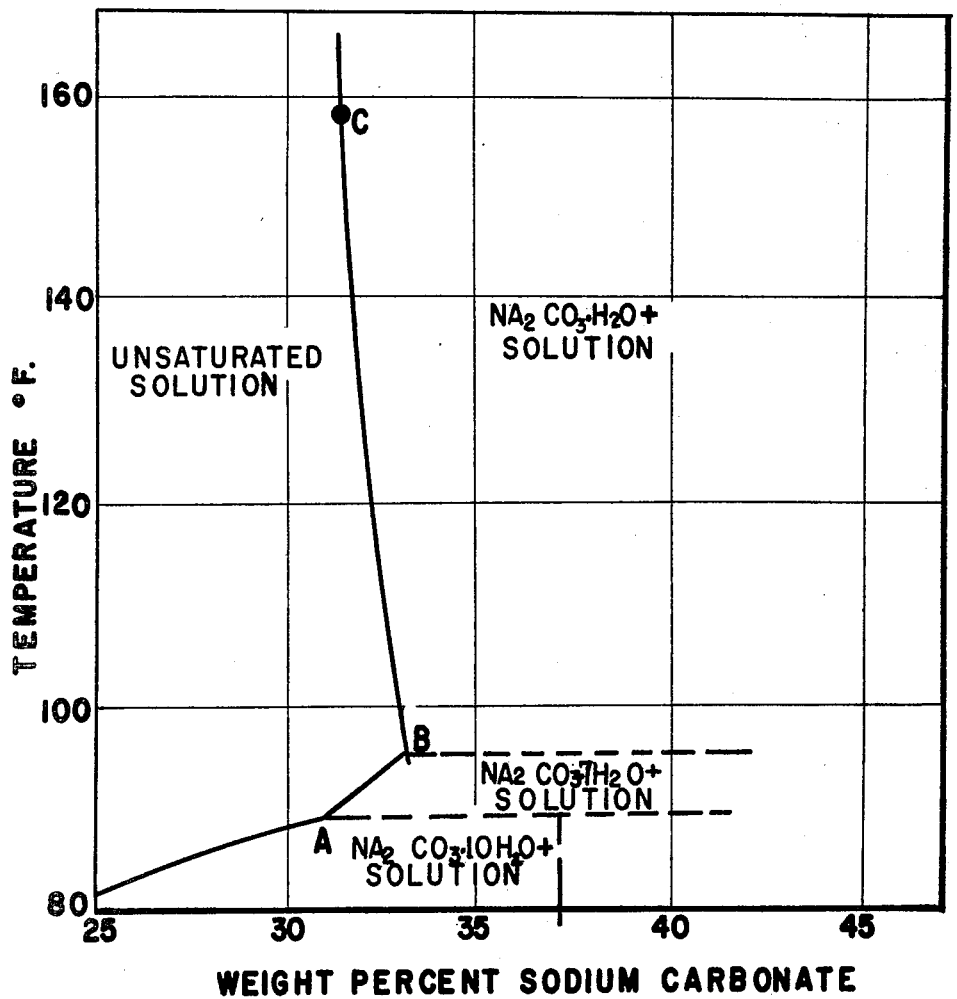
FIG. 1 shows the solubility diagram for sodium carbonate monohydrate.

As shown in FIG. 1, various hydrates can be crystallized from an aqueous solution of soda ash dependent upon the concentration and temperature of the solution.

For example, Point A of FIG. 1 represents the transition point between $Na_2CO_3 \cdot 10H_2O$ and $Na_2CO_3 \cdot 7H_2O$; Point B is the transition point between $Na_2CO_3 \cdot 7H_2O$ and $Na_2CO_3 \cdot H_2O$.

When anhydrous sodium carbonate or calcined crude trona is introduced into water or into an aqueous solvent which may include sodium carbonate in solution, at a temperature above point B in FIG. 1 and below 230° F., it hydrates to sodium carbonate monohydrate. If the solution is unsaturated (area to the left of line B–C) the sodium carbonate monohydrate dissolves in the solution. If the solution is saturated (concentration on line B–C) the sodium carbonate monohydrate formed will not dissolve but will dissolve on dilution of the solution (left of line B–C). The nearer the solution is to saturation, (line B–C), the slower the rate of dissolution of the sodium carbonate monohydrate.

In order to crystallize out sodium carbonate monohydrate from an aqueous solution of sodium carbonate, it is necessary to maintain the temperature within the area above Point B and below 230° F., and the composition to the right of line B–C.

It should be noted that the monohydrate line B–C, shows an inverse solubility for the monohydrate, that is, the monohydrate becomes less soluble in water as the temperature is increased, contrary to the usual phenomenon of increased solubility with increase in temperature.

It is to be further observed that the monohydrate solubility line is quite steep, that is, a small change in concentration of solution with a relatively large change in temperature. This factor makes it necessary to resort to evaporation of the solution in order to provide a sufficient yield of monohydrate crystals from a saturated solution.

For example, a solution saturated at 122° F. contains 32.2 percent $Na_2CO_3$ and at 158° F. contains 31.4 percent $Na_2CO_3$. In heating the saturated solution from 122° to 158° F., approximately 1.5 lbs. of monohydrate per 100 lbs. of original solution are crystallized. By evaporation of only 20 percent of the original solution, the yield of monohydrate increases to approximately 13 lbs. per 100 lbs. of original solution. This increase represents a nine-fold increase in yield.

From the above, we see that evaporation of the carbonate liquors is the only suitable means for recovering sodium carbonate monohydrate from sodium carbonate solutions. Total evaporation of the solution may be used in our process, but this is move expensive than the processes hereinafter described.

From the evaporating and crystallizing area, the crystals of monohydrate and mother liquor are passed to a recovery area where the crystals are separated from the mother liquor and may be washed to remove any residual mother liquor.

The washed crystals are then passed to a calciner where the monohydrate is converted to dense soda ash.

Crude trona contains varying amounts of NaCl and $Na_2SO_4$, with an average analysis of about 0.2 percent. While the presence of NaCl or $Na_2SO_4$ depresses the solubility of the monohydrate, a buildup of NaCl or $Na_2SO_4$, or a combination of both, beyond a certain point results in the formation of complex salts containing NaCl and/or $N_2SO_4$ which may crystallize out with the monohydrate. Therefore, it is preferred to maintain the concentration of NaCl and $Na_2So_4$ below the concentration where they will crystallize. A means of maintaining the concentration at the desired level is to purge the system by committing some of the cycling liquors to waste. It has been found convenient to operate the crystallizers at a concentration of less than about 5 percent, combined NaCl and $Na_2SO_4$.

Figure 2:
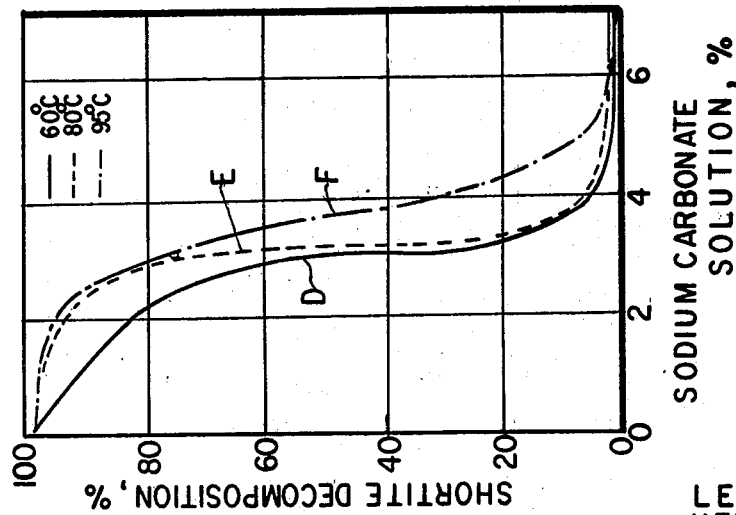
FIG. 2 is a graph showing the percentage decomposition of shortite in sodium carbonate solutions of different strength at different temperatures.

FIG. 2 illustrates the amount of decomposition of shortite in sodium carbonate solutions of different strengths and at different temperatures. In these tests, shortite ground to minus 100-mesh was added in equal amounts to sodium carbonate solutions of different strength at temperatures of 60°, 80° and 95°, C., solutions filtered and the shortite decomposition determined by weighing the residue. As shown by line D, when the solution of sodium carbonate is below 3 percent and is at 60° C., the decomposition of shortite to soluble $Na_2CO_3$ and insoluble $CaCO_3$ is extensive, above 50 percent. However, when the solution has 4 percent sodium carbonate dissolved therein, the decomposition of shortite is reduced to less than 5 percent and above 5 percent sodium carbonate, the decomposition is less than 2 percent and beyond 5 percent concentration of sodium carbonate, the decomposition of shortite is so small it can scarcely be measured within the limits of experimental error.

As shown by lines E and F, at 80° and 95° C., the percent decomposition of shortite increased slightly in solutions where the sodium carbonate concentration was less than 5 percent.

In a continuous process, where a stream of calcined trona is continuously mixed with a stream of aqueous solvent, the dissolution of crude sodium carbonate is so rapid that a high concentration of sodium carbonate is continuously maintained, which is well above the solvent concentration, so that the shortite in the calcined trona does not come into contact with an aqueous solvent containing less than about 5 percent sodium carbonate.

Figure 3:
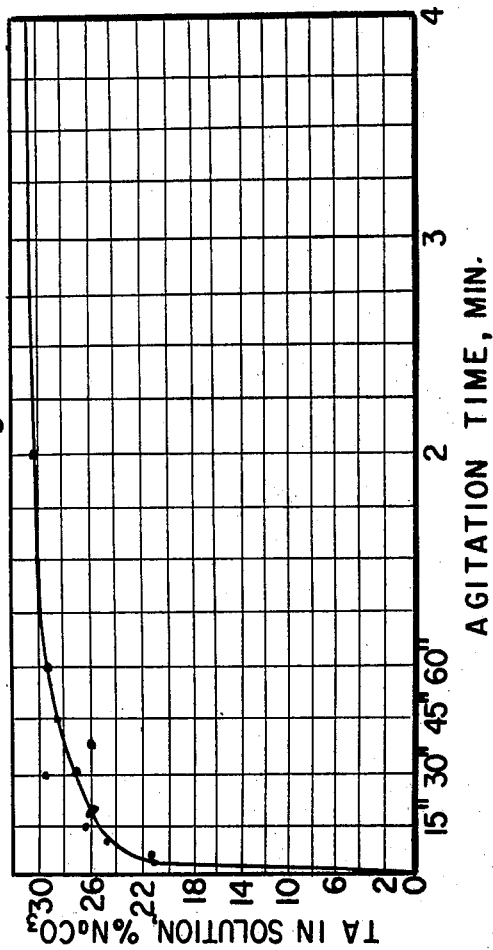
FIG. 3 is a graph showing the dissolving rate of calcined trona in aqueous solutions.

FIG. 3 illustrates the dissolving rate of calcined trona in water. In the tests shown, crude trona, calcined at 200° C., was added to distilled water at 80° C. so that if all the soluble material dissovled the resulting solution would contain more than 30 percent $Na_2CO_3$. The expression "TA in solution" means total alkali in solution. After the calcined trona was added to the water, the mixture was agitated for a given period of time and the solution was filtered. The results of these tests show that within about 2.5 seconds, the sodium carbonate in the solution had reached over 21 percent, by the end of 10 seconds, the solution had more than 24 percent sodium carbonate therein, within 45 seconds, it has over 28 percent sodium carbonate dissolved therein after which the rate of dissolution decreased as the solution approached saturation, as shown by the leveling off of the curve, so that at the end of 2 minutes, the solution has 30 percent sodium carbonate and after 5 minutes, had approximately 31 percent sodium carbonate therein. If an excess of calcined crude trona is added to a solution at 95° C., the results would be similar to those shown in Table I.

Figure 4:
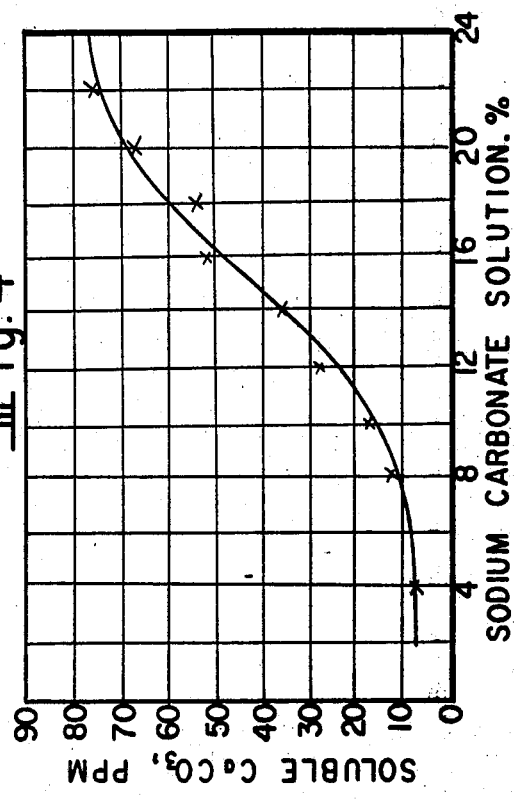
FIG. 4 is a graph showing the solubility of calcium in sodium carbonate solutions of different strength at 95° C.

FIG. 4 shows that as the amount of sodium carbonate in a solution at 95° C. increases, the amount of calcium which may be dissolved therein increases. It may eventually reach about 97 ppm before calcium begins to precipitate out of a dissolver solution. If the dissolver solution contains more than 5 percent dissolved sodium carbonate and less than 97 ppm calcium, no great difficulty with shortite decomposition or calcium precipitation is encountered.

In the particular embodiment of the invention illustrated in FIG. 5, the crude trona crushed to a general size range of less than one-half inch is fed to a calciner 10 wherein the crude trona is converted to crude sodium carbonate by heating at elevated temperatures of the order of 400° to 800° C.

The products of combustion from the direct fired calciner 10, as well as the gaseous products of reaction, namely, water and $CO_2$, are drawn from the calciner by fan 12. A dust collector 11 can be interposed between the calciner and the fan.

The crude sodium carbonate after cooling, if desired, is then passed to a dissolving tank 14 where the sodium carbonate is dissolved in water softened to less than about 130 ppm total hardness or softened wash water containing 6.2 percent or more of sodium carbonate dissolved therein or a mixture of natural hard water and mother liquor or a mixture of water and condensate such that the total hardness of the dissolving liquor is less than 170 ppm and preferably less than 130 ppm total hardness, calculated as calcium carbonate, and the amount of dissolved sodium carbonate is in excess of 6 percent.

If the total hardness of the dissolving liquor entering the dissolvers 14 is less than 170 ppm, then some additional calcium may be dissolved from the crude calcined trona to a total solution hardness of about 120 ppm depending partially on the time or length of contact and the temperature. If the total hardness of the dissolving liquor is not materially in excess of 170 ppm calculated as calcium carbonate, the calcium in the calcined trona in excess of the limit of solubility of the solution (which is about 130 ppm $CaCO_3$), will not dissolve in the dissolvers but will remain with the insolubles and not form objectionable deposits on the equipment, but if the total hardness of the dissolver liquor is above about 170 ppm, this excess of calcium contained in the dissolving liquor will precipitate and cause objectionable deposits, such as pirssonite scale and high calcium contamination of the soda ash. In the dissolvers, the calcined trona is agitated with the dissolving liquor and the insolubles remain suspended in the liquor.

As shown by Example I where the softened wash water and centrifuge crystal wash water going to the dissolvers each hour contained 4 lbs. of $CaCO_3$ or a hardness of 5.6 ppm, the amount of calcium dissolved from the calcined crude trona was 8 lbs. per hour, giving a total of 12 lbs./hr. $CaCO_3$ or a total hardness in the dissolver overflow, or plant liquor of 119 ppm calculated as $CaCO_3$.

If the dissolver liquor per hour had contained 12 lbs. $CaCO_3$ or a hardness of 161 ppm, no calcium would have been dissolved and no calcium would have been precipitated and the dissolver overflow or plant liquor would still have contained 119 ppm $CaCO_3$.

Where the dissolving liquor going to the dissolver contained 170 ppm $CaCO_3$, on addition of the crude calcined trona (26,704 lbs./hr.), thereto, the calcium carbonate concentration of the dissolver liquor contained about 120 ppm $CaCO_3$.

However, if the dissolving liquor going to the dissolvers contains more than 170 ppm $CaCO_3$, calcium will precipitate out in the dissolvers, pumps, piping, etc., and cause objectionable scale and other inconveniences as previously described.

The solution of soda ash and suspended solids may be pumped by pump 15 through heat exchanger 16 to heat the solution sufficiently to prevent the temperature falling below 35° C. and prevent crystallization in the clarifier 17.

The insolubles settle out in the clarifier 17 as the liquor passes through. Sludge forming at the bottom of the clarifier is removed by means of a rotating rake and is washed with water to soften the water and recover the sodium carbonate therein. The relatively clear solution overflows from the clarifier 17 and is pumped by a pump 19 to a surge tank 20. At this point, if there are any suspended solids remaining in the liquid, filter aid may be added to the solution and passed through the filter 22 by pump 21.

The clear solution issuing from the filter is passed to the surge tank 23 and then by pump 24 to the evaporators 25. Before passing into the evaporators 25, the solution is first combined with the recirculated liquor from the centrifuges and then passed through heat exchanger 29 into the evaporator 25 which may be a single evaporator or the first of a series of evaporative crystallizers. The hot solution enters the evaporators where water is removed by evaporation. Where multiple effect evaporators are used, the non-condensable vapors formed may be removed from the latter effects by a steam ejector 27. The condensate from the vapors condensed in condenser 26 may be returned to the dissolvers 14. Multiple effect evaporators are preferably used.

Crystals of sodium carbonate monohydrate and mother liquor are removed by pump 30 which transports the magma to settling tank 31. The crystallized magma is concentrated somewhat in the settling tank and the most concentrated magma is removed by a pump 32 and elevated to the concentrator 33, where the crystals are further concentrated by the action of a vertical screw conveyor which removes the crystals from the mother liquor. Overflow from the crystal concentrator 33 is returned to the settling tank 31. The mother liquor adhering to the crystals from the concentrator 33 is removed in the centrifuge 34 and the crystals washed. From the centrifuge the crystals of monohydrate are passed to a dryer 37A where free water and water of crystallization are removed by heating to form dense soda ash. It will be obvious that the concentrator 33 may be omitted and the crystallized magma passed directly to the centrifuges 34 if desired.

The mother liquor from centrifuge 34 passes to the mother liquor tank 35, as does the overflow from settling tank 31. Pump 36 returns the mother liquors to the evaporator 25 to maintain a magma or crystal concentration of about 20 percent in the evaporators. A portion of the mother liquor may be purged as indicated to prevent a buildup of NaCl and/or $Na_2SO_4$.

In order to provide soft water for the process, the muds from clarifier 17 are passed to a mixing tank 37, where hard natural water containing about 270 ppm of hardness calculated as calcium carbonate is thoroughly mixed with the muds and the mixture passed through the line 38 to a thickener 39. The water may come from natural streams or rivers or from plant storage ponds, where it may contain some sodium carbonate dissolved therein from the process waters used in the plant. In the mixing tank 37 and thickener 39, the calcium and magnesium in the hard water is precipitated as calcium and magnesium carbonate from the hard makeup water and is discharged with the muds to waste through the line 40 and at the same time the undissolved sodium values in the clarifier muds are dissolved and returned to the process. The water softened to about 56 ppm total hardness calculated as calcium carbonate overflowing from the thickeners 39 is pumped through line 41 to the dissolving tank 14, where it is used to dissolve more crude calcined trona.

In effect, the flow of dissolver or makeup water is counter current to the flow of crude calcined trona and trona muds or gangue, as the dissolver or makeup water is first brought into contact with the muds after the muds have been separated from the saturated sodium carbonate solution in the first clarifier 17, and the dilute sodium carbonate solution formed in contact with the muds is flowed counter current to the flow of the main calcined carbonate and mud stream to dissolve more sodium carbonate therefrom. The incoming dissolver water is contacted first with the spent or extracted ore to recover some carbonate values therefrom and the dissolver water carrying some carbonate values is then contacted with the fresh calcined ore stream to remove more carbonate values therefrom, the substantially saturated solution of sodium carbonate is separated from the spent ore and the spent ore is contacted with fresh dissolver water. This process can be regulated as desired to produce more or less concentrated solutions in the initial contact of the incoming water with the spent ore.

If water is used to wash the crystals on centrifuge 34 it may be filtered softened overflow water from the thickener 39 or condensate or evaporator feed liquor may be used for washing the crystals. The crystal wash water may be flowed into the mixing tank 37. In this way, only softened water is introduced into the process. The centrifuge wash water combined with the water from the mud washing provide a feed of soft water to dissolver 14 containing about 6.2 percent sodium carbonate dissolved therein.

FIG. 6 illustrates diagrammatically another procedure according to the present invention. In this embodiment the crude trona is calcined in calciner 10 to crude sodium carbonate which is conveyed via line 42 into the dissolver 43 wherein the sodium carbonate is dissolved in mother liquor recycled from the centrifuge and settling area 57, via line 60, and makeup water from the line 53. The resulting crude sodium carbonate solution carrying the insoluble muds is passed to clarifier 45 from the dissolver by line 44 wherein the insoluble muds are settled out and the clarified overflow passes through line 46 to filter 47.

The muds are removed from clarifier 45 through line 48 to a head tank 49 where they are thoroughly mixed with hard makeup water natural to the region. The resulting mixture is passed by line 50 to the thickener 51. The calcium in the water is precipitated as calcium carbonate thereby softening the water and the muds carrying the precipitated calcium carbonate are removed from the thickener 51 through line 52 and disposed of as waste. The softened water overflowing from the thickener 51 flows through line 53 and is added to the mother liquor in line 60, being recycled to the dissolver 43 to provide softened water for dissolving the crude calcined trona. As shown by Example II the combined feed from line 53 and line 60 flowing into dissolver 43 carries above 11.4 percent dissolved sodium carbonate therein.

The filtered sodium carbonate solution is passed through line 54 from the filter 47 to the crystallizer 55 wherein water is removed by evaporation, and a slurry of sodium carbonate monohydrate crystals is formed in the mother liquor. The vapors from the crystallizers may be discharged to the atmosphere or may be led by line 62 through condenser 64 to a spray pond, for example, from which the cooled water is returned to the condenser. Multiple effect evaporative crystallizers are preferably used. The crystal slurry is passed from the crystallizer 55 through line 56 to a centrifuge station 57 wherein the mother liquor is separated from the sodium carbonate monohydrate crystals by settling and centrifugation. The sodium carbonate monohydrate crystals are passed through line 58 to the calciner 59 where the sodium carbonate monohydrate crystals are calcined to soda ash. The mother liquor from the centrifuge station 57 is recycled via line 60 to the dissolver 43 to dissolve more crude sodium carbonate after purging enough mother liquor to prevent the buildup of impurities and after receiving sufficient softened makeup water from the line 53 to replace the water evaporated in the crystallizers 55.

The mother liquor returned through the line 60 has a temperature of about 70° C., it is cooled by the addition of the softened makeup water through the line 53 to about 50° C. and may be further cooled if desired.

Instead of crystallizing sodium carbonate monohydrate in the crystallizers, anhydrous sodium carbonate crystals may be formed by crystallizing at elevated temperatures and pressures as described in U.S. Pat. No. 2,770,524.

Pressures above 1.15 atmospheres absolute and temperatures above 109° C. are required in the crystallizers to form anhydrous sodium carbonate. If the wet anhydrous sodium carbonate crystals are centrifuged at atmospheric pressure, they may partially convert into sodium carbonate monohydrate. The term "sodium carbonate crystals" as used herein is meant to include both sodium carbonate monohydrate crystals and anhydrous sodium carbonate crystals.

FIG. 7 illustrates a further modification in which crude trona is calcined in direct fired calciner 10, the gaseous products of the reaction are withdrawn by fan 12 and the dust particles recovered in cyclone 11 are returned to the calcined trona stream going to dissolver 73.

In the dissolver 73, the crude sodium carbonate is dissolved in a solution produced from evaporator condensate recycled form the line 98 and thickener wash water from the line 103, mixed in such proportions that the total hardness of the combined dissolver feed liquor streams is less than 170 ppm and preferably less than 130 ppm.

The solution of soda ash and suspended solids is pumped by pump 74 to the clarifier 75. The insolubles settle out in the clarifier as the liquor passes through. Sludge forming at the bottom of the clarifier is removed by means of a rotating rake and may be washed with water to soften the water and recover sodium carbonate therein. The relatively clear solution overflows from the clarifier 75 and is pumped by a pump 76 to a surge tank 77. At this point, if there are any suspended solids remaining in the liquid, filter aid may be added to the solution and passed through the filter 79 by pump 78.

The clear solution issuing from the filter is passed to the surge tank 81 and then by pump 82 to the evaporators 84, 85 and 86. Before passing into the evaporators 84, 85 and 86, the solution is first combined with recirculated liquor from the centrifuge 92. The hot solution enters the evaporator 84 where sufficient heat is supplied to cause boiling and removal of water by evaporation. The evaporated water from evaporator 84 is passed by line 87 to supply heat to evaporator 85. The vapors formed in evaporator 85 are removed via line 88 and passed to evaporator 86. Recirculation within each evaporator circuit is normally also used. The heat supplied to evaporator 86 causes additional water evaporation. The vapors formed in evaporator 86 are condensed in condenser 89 with any remaining non-condensed gases removed by a steam ejector 90. The condensed vapors from evaporators 85 and 86 are recycled to the dissolvers via line 98. The evaporators 84, 85 and 86 preferably are operated at about 100°, 75°, and 50° C., respectively.

Crystals of sodium carbonate monohydrate and mother liquor are removed by pump 91. The mother liquor adhering to the crystals from the evaporator 86 is removed in the centrifuge 92. From the centrifuge the crystals of monohydrate are passed to a calciner or dryer 93 where free water and water of crystallization are removed to form dense soda ash.

The mother liquor from the centrifuge 92 passes to the mother liquor tank 94. Pump 95 returns the mother liquors to the evaporator 84 to maintain a magma or crystal concentration as in Example 3 of approximately 40 percent in the third stage evaporator slurry. If desired, the mother liquor may be returned to the third stage evaporator 86.

In order to provide soft water for the process, the muds from clarifier 75 are passed to a mixing tank 99, where water containing about 270 ppm of hardness calculated as calcium carbonate is thoroughly mixed with the muds and the mixture passed through the line 100 to a thickener 101. In the mixing tank 99 and thickener 101 the calcium in the hard water is precipitated and the calcium carbonate precipitate is discharged with the muds to waste through the line 102 and at the same time the undissolved sodium values in the clarifier muds are dissolved and returned to the process. The clear softened water flowing from the thickener 101 and containing about 8 percent sodium carbonate dissolved therein is pumped through line 103 to the dissolving tank 73, where it is mixed with the condensate from the evaporators, flowing into the dissolver from line 98 and is used to dissolve more crude calcined trona.

In the operation of a plant such as described in connection with FIG. 7, about 50 percent of the required water to the dissolvers can be recovered as soft water condensate from the evaporators 85, 86 and if mixed directly with hard natural water constituting the other 50 percent of the dissolver feed liquor, will provide a dissolving liquor of a total hardness of about 135 ppm. A softened dissolving liquor produced in this way may be used in our process and is within the scope of our invention. We prefer, however, to also soften the hard natural water used to provide a part of the dissolver liquor by passing it in contact with the muds from the clarifier to thereby soften this portion of the makeup water to about 50 ppm total hardness and to dissolve and recover additional sodium carbonate from the clarifier muds.

Although dissolver liquor having a total hardness of below 130 ppm will dissolve additional calcium from the calcined trona in the dissolvers and eventually reach a total hardness of about 97 ppm in the plant liquors, this is a matter of time and calcium concentration in the dissolvers and we prefer to introduce into the dissolvers a dissolver liquor having a total hardness of less than 130 ppm.

As stated above, the limit of solubility of calcium in the dissolver discharge liquor is about 130 ppm total hardness calculated as calcium carbonate and about 97 ppm in a 31 percent solution of sodium carbonate at about 95° C., and if water of a hardness below 170 ppm is used in the dissolvers some calcium will precipitate in the dissolvers, but this small amount will cause no harm and not lead to objectionable scaling of the equipment.

In order to show the softening effect of the clarifier muds on raw natural water, three tests were conducted with raw water having a total hardness of 200 to 220 ppm calculated as calcium carbonate by agitating moist insoluble muds with raw water for 30 minutes and testing the filtrate for hardness with the following results:

TABLE II

| Temperature of Original Dissolution | Total Hardness of Filtrate |
|---|---|
| 35° C. | 61 ppm |
| 65° C. | 50 ppm |
| 95° C. | 33 ppm |

In general, raw water having up to 270 ppm total hardness is softened to a hardness of below 56 ppm in passing through the thickeners.

The calcium in the crystallizer liquor deposits almost completely with the sodium carbonate crystals so that the higher the calcium content of the evaporator or crystallizer liquor, the higher the calcium contamination of the final soda ash.

This is shown by the following table in which solutions having different degrees of total hardness were partially evaporated to crystalline $Na_2CO_3 \cdot H_2O$ and the crystal hardness in ppm of $CaCO_3$ determined.

TABLE III

| Crystallizer Solution Total Hardness | Crystal Calcium Hardness |
|---|---|
| 58 ppm $CaCO_3$ | 110 ppm $CaCO_3$ |
| 87 ppm $CaCO_3$ | 185 ppm $CaCO_3$ |
| 139 ppm $CaCO_3$ | 354 ppm $CaCO_3$ |
| 214 ppm $CaCO_3$ | 1180 ppm $CaCO_3$ |
| 259 ppm $CaCO_3$ | 1180 ppm $CaCO_3$ |
| 344 ppm $CaCO_3$ | 1370 ppm $CaCO_3$ |
| 444 ppm $CaCO_3$ | 2030 ppm $CaCO_3$ |
| 600 ppm $CaCO_3$ | 3950 ppm $CaCO_3$ |

Thus in order to prevent excessive calcium contamination of the soda ash it is necessary to prevent the introduction of excessive calcium into the crystallizer liquor.

The term "hard water" is meant to include any water having a total hardness in excess of 170 ppm calculated as calcium carbonate. The term "soft water" includes any water having a total hardness of 170 ppm or less calculated as calcium carbonate. By using natural hard waters of the Green River region softened to a total hardness of less than 170 ppm, no pirssonite or objectionable calcium scale is formed on the process equipment and by using a dissolver solution containing in excess of 5 percent of sodium carbonate previously dissolved therein, little shortite in the calcined crude trona is decomposed, and the amount of calcium carbonate contamination of the soda ash is greatly reduced.

Crude trona contains varying amounts of sodium chloride and sodium sulfate. The presence of sodium chloride or sodium sulfate will depress the solubility of the sodium carbonate monohydrate and increase the size of the monohydrate crystals but an excessive build-up of sodium chloride and/or sodium sulfate results in the crystallization of complex salts with the monohydrate crystals. Therefore, it is preferred to maintain the concentration of sodium chloride and sodium sulfate below their respective crystallization concentrations. This is accomplished by the purging of some of the mother liquor to waste. A convenient concentration is about 5 percent or less of combined sodium chloride and sodium sulfate.

The presence of relatively large amounts of $Na_2SO_4$ up to about 3 percent in the crystallizer solutions from which sodium carbonate monohydrate crystals are crystallized increases the size of the monohydrate crystals and materially reduces the percentage of −100 mesh particles but above about 3 percent $Na_2SO_4$, complex salts such as burkeite ($2Na_2CO_3 \cdot 3Na_2SO4$) begin to crystallize out of the solution.

While it is preferred to maintain the sulfate plus chloride concentration in the evaporator circuit between about 0.6 percent and about 5 percent by recirculating the mother liquor, and purging the mother liquor stream when necessary to prevent excessive build-up of sulfate and chloride, it will be understood that the sulfate and chloride content can be maintained within the desired limits to promote crystallization of larger size monohydrate crystals in the evaporators by adding sulfate or chloride or both to the solution going into the evaporators.

In the following examples, the sodium sulfate plus sodium chloride concentration of the evaporator solution is maintained between about 0.6 and 5 percent during evaporation. The preferred range is between about 0.6 and about 2.5 percent of total sulfate and chloride.

In the examples, several preferred embodiments are described to illustrate the invention. However, it should be understood that the invention is not intended to be limited to the specific embodiments.

EXAMPLE I

In accordance with the embodiment of FIG. 5 for the production of 100,000 tons per year of dense soda ash, the following quantities are used, based on an 8,000 hour year:

Analysis Of Crude Calcined Trona

| Constituent | Percent |
|---|---|
| $Na_2CO_3$ | 85.9 |
| $NaCl + Na_2SO_4$ | 0.2 |
| Organics | Nil |
| Insolubles | 13.7 |
| | Total: 99.8 |

Analysis Of Finished Soda Ash

| Constituent | Percent |
|---|---|
| $Na_2CO_3$ | 99.94 |
| $NaCl + Na_2SO_4$ | 0.01 |
| $CaCO_3$ | 0.04 |
| | Total: 99.99 |

Bulk density 60 lbs/cu. ft.

| | |
|---|---|
| Lbs. of crude trona/hour | 42,143 |
| Lbs. of crude soda ash/hour | 31,087 |

Softened wash water effluent and centrifuge crystal wash water effluent to dissolvers, lbs. per hour

| | |
|---|---|
| $Na_2CO_3$ | 4,700 |
| $NaCl + Na_2SO_4$ | 103 |
| $H_2O$ | 69,934 |
| Hardness as $CaCO_3$ | 4 |
| Total: | 74,741 |

Dissolver effluent, lbs/hour

| | | |
|---|---|---|
| $Na_2CO_3$ | 31,404 | |
| $NaCl + Na_2SO_4$ | 169 | |
| $H_2O$ | 69,934 | |
| Insolubles | 4,252 | |
| Hardness as $CaCO_3$ (soluble) | 12 | |
| Total: | 105,771 | 105,771 |

Clarifier Sludge to Thickener, lbs/hour

| | | |
|---|---|---|
| $Na_2CO_3$ | 3,866 | |
| $NaCl + Na_2SO_4$ | 21 | |
| $H_2O$ | 8,588 | |
| Insolubles | 4,167 | |
| Total: | 16,642 | 16,642 |

Thickener Feed, lbs/hour

| | | |
|---|---|---|
| $Na_2CO_3$ | 3,866 | |
| $NaCl + Na_2SO_4$ | 21 | |
| $H_2O$ | 77,674 | |
| Insolubles | 4,167 | |
| Hardness as $CaCO_3$ (soluble) in raw water | 18 | |
| Total: | 85,746 | 85,746 |

Thickener Wash Water Effluent to Dissolvers, lbs/hour

| | | |
|---|---|---|
| $Na_2CO_3$ | 3,274 | |
| $NaCl + Na_2SO_4$ | 18 | |
| $H_2O$ | 65,773 | |
| Insolubles | 0 | |
| Hardness as $CaCO_3$ (soluble) | 4 | |
| Total: | 69,069 | 69,069 |

Thickener Discharge to Water, lbs/hour

| | | |
|---|---|---|
| $Na_2CO_3$ | 592 | |
| $NaCl + Na_2SO_4$ | 3 | |
| $H_2O$ | 11,901 | |
| Insolubles | 4,167 | |
| Hardness as $CaCO_3$ (precipitated) | 14 | |
| Total: | 16,677 | 16,677 |

Evaporator feed, lbs/hour

| | | |
|---|---|---|
| $Na_2CO_3$ | 27,458 | |
| $NaCl + Na_2SO_4$ | 198 | |
| $H_2O$ | 61,167 | |
| Insolubles | 0 | |
| Hardness as $CaCO_3$ | 12 | |
| Total: | 88,835 | 88,835 |

The quantities for the evaporators are based on use of three evaporators with mother liquor recycled to the second and third evaporators. Temperatures of the magma from the evaporators are 98°, 84° and 70° C., respectively.

Mother liquor recycled, lbs./hour

| | | |
|---|---:|---:|
| Na$_2$CO$_3$ | | 30,784 |
| NaCl + Na$_2$SO$_4$ | | 2,888 |
| H$_2$O | | 78,942 |
| Hardness as | | |
| CaCO$_3$(soluble) | | 1 |
| | Total: | 112,615 |

Mother liquor from crystal settling and centrifuging, lbs/hour

| | | |
|---|---:|---:|
| Na$_2$CO$_3$ | | 31,306 |
| NaCl + Na$_2$SO$_4$ | | 2,934 |
| H$_2$O | | 80,108 |
| Hardness as | | |
| CaCO$_3$ (soluble) | | 1 |
| | Total: | 114,349 |

Purged mother liquor, lbs/hour

| | | |
|---|---:|---:|
| Na$_2$CO$_3$ | | 523 |
| NaCl + Na$_2$SO$_4$ | | 49 |
| H$_2$O | | 1,167 |
| CaCO$_3$ | | Nil |
| | Total: | 1,739 |

Centrifuge crystals wash water effluent, lbs/hour

| | | |
|---|---:|---:|
| Na$_2$CO$_3$ | | 1,428 |
| NaCl + Na$_2$SO$_4$ | | 88 |
| H$_2$O | | 4,162 |
| CaCO$_3$ | | Nil |
| | Total: | 5,678 |

| | |
|---|---:|
| Moist centrifuge crystals, lbs/hour | 31,873 |
| Soda ash produced, lbs/hour | 25,000 |
| Water to dissolver (sludge and centrifuge washings), lbs/hour | 69,935 |

As indicated above, the wash water from the sludge washing and crystal washing containing about 6.2 percent sodium carbonate is used in the dissolvers 14 to dissolve sodium carbonate from the crude calcined trona. In this way, the dissolving water is softened and the sodium carbonate dissolved therein is recovered.

EXAMPLE II

When the embodiment of the invention described in connection with FIG. 6 is used to produce anhydrous sodium carbonate crystals, the following relative quantities are used, based upon the production of 100,000 tons per year of soda ash.

Analysis Of Crude Calcined Trona

| Constituent | Percent | Lbs/hour |
|---|---:|---:|
| Na$_2$CO$_3$ | 85.81 | 26,119 |
| NaCl + Na$_2$SO$_4$ | 0.17 | 51 |
| Organics | — | — |
| CaCO$_3$ (soluble) | 0.02 | 7 |
| Insolubles | 14.0 | 4,262 |
| Lbs Crude Ash/Hour | | Total: 30,439 |

Water evaporated in dissolvers from cooling crude ash from 500 to 94° C. = 4,199 lbs/hour Dissolver Effluent

| | | |
|---|---:|---:|
| Na$_2$CO$_3$ | 30.64 | 36,837 |
| NaCl + Na$_2$SO$_4$ | 0.51 | 617 |
| H$_2$O | 65.30 | 78,516 |
| CaCO$_3$ | 0.01 | 12 |
| Insolubles | 3.54 | 4,262 |
| | | Total: 120,244 |

Clarifier Sludge To Thickener

| | | |
|---|---:|---:|
| Na$_2$CO$_3$ | 27.46 | 3,381 |
| NaCl + Na$_2$SO$_4$ | 0.30 | 37 |
| H$_2$O | 37.63 | 4,633 |
| CaCO$_3$ | — | Nil |
| Insolubles | 34.61 | 4,262 |
| | | Total: 12,313 |

Thickener Feed

| | | |
|---|---:|---:|
| Na$_2$CO$_3$ | 4.33 | 3,381 |
| NaCl + Na$_2$SO$_4$ | 0.05 | 37 |
| H$_2$O | 90.16 | 70,425 |
| CaCO$_3$ (introduced with the water) | 0.02 | 18 |
| Insolubles | 5.46 | 4,262 |
| | | Total: 78,123 |

Thickener Discharge To Waste

| Constituent | Percent | Lbs/Hour |
|---|---:|---:|
| Na$_2$CO$_3$ | 7.36 | 697 |
| H$_2$O | 47.39 | 4,484 |
| NaCl + Na$_2$SO$_4$ | 0.05 | 5 |
| CaCO$_3$ | 0.14 | 14 |
| Insolubles | 45.04 | 4,262 |
| | | Total: 9,462 |

Underflow maintained at 45% insolubles.

Thickener Overflow To Dissolvers

| | | |
|---|---:|---:|
| Na$_2$CO$_3$ | 3.91 | 2,684 |
| NaCl + Na$_2$SO$_4$ | 0.05 | 32 |
| H$_2$O | 96.03 | 65,941 |
| CaCO$_3$(soluble) | 0.006 | 4 |
| Insolubles | | Nil |
| | | Total: 68,661 |

Evaporator Feed

| | | |
|---|---:|---:|
| Na$_2$CO$_3$ | 30.78 | 33,456 |
| NaCl + Na$_2$SO$_4$ | 0.53 | 580 |
| H$_2$O | 67.97 | 73,883 |
| CaCO$_3$ | 0.01 | 12 |
| | | Total: 107,931 |

Lbs H$_2$O evaporated from Pressure Evaporator = 49,968 lbs/hour

Filter Feed

| | | |
|---|---:|---:|
| Na$_2$CO$_3$ | 57.74 | 33,456 |
| NaCl + Na$_2$SO$_4$ | 1.00 | 580 |
| H$_2$O | 41.27 | 23,815 |
| CaCO$_3$ | 0.02 | 12 |
| | | Total: 57,863 |

Lbs H$_2$O evaporated from Pressure Filter = 672 lbs/hour

Mother Liquor Recycled

| | | |
|---|---:|---:|
| Na$_2$CO$_3$ | 31.67 | 8,034 |
| NaCl + Na$_2$SO$_4$ | 2.10 | 534 |
| H$_2$O | 66.23 | 16,792 |
| CaCO$_3$ | 0.004 | 1 |
| | | Total: 25,631 |

Purged Mother Liquor

| | Percent | Lbs/Hour |
|---|---:|---:|
| Na$_2$CO$_3$ | 31.67 | 422 |
| NaCl + Na$_2$SO$_4$ | 2.10 | 28 |
| H$_2$O | 66.23 | 883 |
| CaCO$_3$ | Nil | — |
| | | Total: 1,333 |

Moist Filter Cake
Assuming 40% of the crystals revert to monohydrate and 6% mother liquor

| Constituent | Percent | Lbs/Hour |
|---|---:|---:|
| Na$_2$CO$_3$ | 81.71 | 25,000 |
| NaCl + Na$_2$SO$_4$ | 0.06 | 18 |
| CaCO$_3$ | 0.04 | 11 |
| H$_2$O | 18.20 | 5,567 |
| | | Total: 30,596 |

Ash Produced

| | | |
|---|---:|---:|
| Na$_2$CO$_3$ | 99.88 | 25,000 |
| CaCO$_3$ | 0.04 | 11 |
| NaCl + Na$_2$SO$_4$ | 0.07 | 18 |
| | | Total: 25,029 |

EXAMPLE III

When the embodiment of the invention described in connection with FIG. 7 is used to produce 100,000 tons of soda ash per year, the following quantities are used, based on an 8,000 hour year and on the assumption that calcium is dissolved as calcium carbonate to the limit of solubility in the dissolvers.

Analysis Of Crude Calcined Trona

| Constituent | Percent | Wt Lbs/Hour |
|---|---:|---:|

| Constituent | Percent | Lbs/Hour |
|---|---|---|
| Na₂CO₃ | 85.81 | 26,119 |
| NaCl + Na₂SO₄ | 0.17 | 51 |
| Organics | — | — |
| CaCO₃ (soluble) | 0.02 | 7 |
| Insolubles | 14.0 | 4,262 |
| | | Total: 30,439 |

Recycled Evaporator Condensate to Dissolvers: 33,052 lbs/hour

Thickener Overflow To Dissolvers

| Constituent | Percent | Lbs/Hour |
|---|---|---|
| Na₂CO₃ | 7.95 | 2,893 |
| NaCl + Na₂SO₄ | .01 | 5 |
| CaCO₃ | .05 | 2 |
| H₂O | 92.02 | 33,460 |
| | | Total: 36,360 |

Total solution weight to dissolvers: 69,412 lbs/hour

Water evaporated in dissolvers from cooling Crude Ash from 500° C. to 90° C.: 4,860 lbs/hour

Dissolver Effluent

| Constituent | Percent Concentration | Wt Lbs/Hour |
|---|---|---|
| Na₂CO₃ | 30.54 | 29,012 |
| NaCl + Na₂SO₄ | .06 | 56 |
| H₂O | 64.90 | 61,652 |
| CaCO₃ | .01 | 9* |
| Insolubles | 4.49 | 4,262 |
| | | Total: 94,991 |

*(in solution)

Clarifier Sludge To Thickener

| Constituent | Percent | Lbs/Hour |
|---|---|---|
| Na₂CO₃ | 27.45 | 3,378 |
| NaCl + Na₂SO₄ | .09 | 6 |
| H₂O | 37.87 | 4,660 |
| CaCO₃ | — | Nil |
| Insolubles | 34.63 | 4,262 |
| | | Total: 12,306 |

(Clarifier sludge is held at 45% solids made up of insolubles and undissolved ore. U.D. ore to Insolubles Ratio = 0.3).

Hard Water added to Clarifier Sludge: 33,615 lbs/hour at 270 ppm total hardness or 10 lbs/hour CaCO₃

Thickener Feed

| Constituent | Percent | Wt Lbs/Hour |
|---|---|---|
| Na₂CO₃ | 6.78 | 3,378 |
| NaCl + Na₂SO₄ | 0.01 | 6 |
| H₂O | 84.63 | 42,190 |
| CaCO₃ | 0.02 | 10 |
| Insolubles | 8.55 | 4,262 |
| | | Total: 49,846 |

Thickener Discharge To Waste

| Constituent | Percent | Lbs/Hour |
|---|---|---|
| Na₂CO₃ | 5.07 | 485 |
| NaCl + Na₂SO₄ | 0.01 | 1 |
| H₂O | 50.32 | 4,815 |
| CaCO₃ | 0.08 | 8 |
| Insolubles | 44.54 | 4,262 |
| | | Total: 9,571 |

(The thickener underflow is maintained at 45% solids)

Evaporator Feed

| Constituent | Percent | Lbs/Hour |
|---|---|---|
| Na₂CO₃ | 30.99 | 25,634 |
| NaCl + Na₂SO₄ | 0.07 | 62 |
| H₂O | 68.90 | 56,992 |
| CaCO₃ | 0.01 | 9 |
| | | Total: 82,697 |

The evaporators are triple effect. The third stage slurry contains 40% crystals. An equal amount of water is removed in each effect.

Lbs H₂O evaporated in Evaporators: 49,578 lbs/hr

Lbs H₂O evaporated and sent to Cooling Tower: 16,526 lbs/hr

Mother Liquor Recycled

| Constituent | Percent | Lbs/Hour |
|---|---|---|
| Na₂CO₃ | 32.20 | 12,056 |
| NaCl + Na₂SO₄ | 1.72 | 643 |
| H₂O | 66.07 | 24,728 |
| CaCO₃ | 0.01 | 2 |
| | | Total: 37,429 |

Purged Mother Liquor

| Constituent | Percent | Lbs/Hour |
|---|---|---|
| Na₂CO₃ | 32.02 | 634 |
| NaCl + Na₂SO₄ | 2.22 | 44 |
| H₂O | 65.76 | 1,302 |
| CaCO₃ | — | Nil |
| | | Total: 1,980 |

Moist Centrifuge Crystals

| Constituent | Percent | Lbs/Hour |
|---|---|---|
| Na₂CO₃ | 80.28 | 25,000 |
| NaCl + Na₂SO₄ | 0.06 | 18 |
| H₂O | 19.63 | 6,113 |
| CaCO₃ | 0.031 | 9 |
| Total: | 100.00% | 31,140 |

Soda Ash Produced

| Constituent | Percent | Lbs/Hour |
|---|---|---|
| Na₂CO₃ | 99.89 | 25,000 |
| NaCl + Na₂SO₄ | 0.07 | 18 |
| H₂O | — | — |
| CaCO₃ | 0.04 | 9 |
| Totals: | 100.00% | 25,027 |

EXAMPLE IV

According to the process of FIG. 5 for the production of 100,000 tons per year of dense soda ash the following quantities are used, based on an 8,000 hour year:

Analysis Of Crude Calcined Trona

| Constituent | Percent |
|---|---|
| Na₂CO₃ | 85.9 |
| NaCl + Na₂SO₄ | 0.4 |
| Organics | Nil |
| Insolubles | 13.7 |
| Total: | 100.0 |

Analysis Of Finished Soda Ash

| Constituent | Percent |
|---|---|
| Na₂CO₃ | 99.98 |
| NaCl + Na₂SO₄ | 0.02 |
| Total: | 100.00 |

Bulk density, lbs./cu. ft.: 60

Lbs. of crude trona/hour: 42,143
Lbs. of crude soda ash/hour: 31,087

Sludge wash water effluent and centrifuge crystal wash water effluent to dissolvers, lbs. per hour:

| | | |
|---|---|---|
| Na₂CO₃ | 4,700 | |
| NaCl + Na₂SO₄ | 206 | |
| H₂O | 69,934 | |
| Total: | 74,840 | 74,840 |

Dissolver effluent, lbs./hour:

| | | |
|---|---|---|
| Na₂CO₃ | 31,404 | |
| NaCl + Na₂SO₄ | 337 | |
| H₂O | 69,934 | |
| Insolubles | 4,252 | |
| Total: | 105,927 | 105,927 |

Clarifier sludge to waste, lbs./hour:

| | | |
|---|---|---|
| Na₂CO₃ | 592 | |
| NaCl + Na₂SO₄ | 6 | |
| H₂O | 11,901 | |
| Insolubles | 4,167 | |
| Total: | 16,666 | 16,666 |

Sludge wash water effluent, lbs./hour:

| | | |
|---|---|---|
| Na₂CO₃ | 3,274 | |
| NaCl + Na₂SO₄ | 36 | |
| H₂O | 65,773 | |
| Total: | 69,083 | 69,083 |

Evaporator feed, lbs./hour:

| | | |
|---|---|---|
| Na₂CO₃ | 27,458 | |
| NaCl + Na₂SO₄ | 295 | |
| H₂O | 61,167 | |
| Total: | 88,920 | 88,920 |

The quantities for the evaporators are based on use of three evaporators with mother liquor recycled to the second and third evaporators. Temperatures of the magma from the evaporators are 98°, 84°, and 70° C., respectively.

| | | |
|---|---:|---:|
| Mother liquor recycled, lbs./hour: | | |
| $Na_2CO_3$ | 30,784 | |
| $NaCl + Na_2SO_4$ | 5,776 | |
| $H_2O$ | 78,942 | |
| Total: | 115,502 | 115,502 |
| Mother liquor from crystal settling and centrifuging, lbs./hour: | | |
| $Na_2CO_3$ | 31,306 | |
| $NaCl + Na_2SO_4$ | 5,867 | |
| $H_2O$ | 80,108 | |
| Total: | 117,281 | 117,281 |
| Purged mother liquor, lbs./hour: | | |
| $Na_2CO_3$ | 523 | |
| $NaCl + Na_2SO_4$ | 98 | |
| $H_2O$ | 1,167 | |
| Total: | 1,788 | 1,788 |
| Centrifuge crystal wash water effluent, lbs./hour: | | |
| $Na_2CO_3$ | 1,428 | |
| $NaCl + Na_2SO_4$ | 177 | |
| $H_2O$ | 4,162 | |
| Total: | 5,767 | 5,767 |
| Moist centrifuge crystals, lbs./hr. | | 31,873 |
| Soda ash produced, lbs./hr. | | 25,000 |
| Water to dissolver (sludge and centrifuge washings) lbs./hr. | | 69,935 |

As indicated above, the wash water from the sludge washing and crystal washing containing about 6.2 percent sodium carbonate is used in the dissolvers 14 to dissolve sodium carbonate from the crude calcined trona. In this way the sodium carbonate dissolved therein is recovered.

Various modifications of the process of the present invention may be made and the sequence of the various steps may be altered without departing from the spirit or scope of the invention, and it is to be understood that the invention is limited only as defined in the appended claims.

What is claimed is:

1. In a process for preparing refined soda ash from crude trona, calcining the crude trona at a temperature between about 150° C. and about 200° C. to crude sodium carbonate, mixing the crude sodium carbonate with an aqueous solution of sodium carbonate containing at least 6 percent sodium carbonate to form a substantially saturated solution of sodium carbonate, separating the saturated solution of sodium carbonate from the gangue solids, removing slimes from said saturated solution of sodium carbonate, evaporating said saturated solution to crystallize sodium carbonate crystals therefrom, separating the sodium carbonate crystals from the mother liquor and calcining to produce soda ash and recycling the mother liquor to the evaporator circuit.

2. A process for the preparation of refined dense soda ash from crude trona, containing an insoluble fraction, which has shortite therein, which comprises calcining the crude trona at a temperature and for a time sufficient to convert the sodium sesquicarbonate in the crude trona into sodium carbonate and provide anhydrous calcined crude trona, containing a soluble and an insoluble fraction in solid phase therein, introducing the soluble sodium carbonate fraction from said calcined crude trona in solid phase together with the insoluble fraction and an aqueous solvent into a dissolver, and forming an aqueous solution of the sodium carbonate in the presence of the insoluble solid phase fraction in said dissolver, separating said solution of sodium carbonate from the insoluble solid phase, removing entrained solids from said solution of sodium carbonate to provide a clear solution, evaporating said clear solution and recovering sodium carbonate monohydrate crystals therefrom and calcining said crystals to dense soda ash and recycling the mother liquor from said monohydrate crystals to the evaporators for further monohydrate crystal recovery therefrom, contacting said insoluble solid phase with an aqueous solvent to recover additional sodium carbonate solution therefrom and form an unsaturated solution of sodium carbonate, separating said unsaturated solution from the insoluble phase, and discarding the insoluble phase and recycling said unsaturated sodium carbonate solution recovered from the insoluble phase to the dissolver and dissolving more sodium carbonate therein.

3. A process for the preparation of dense sodium carbonate from crude trona, containing an insoluble fraction, which has shortite therein, which comprises calcining the crude trona at a temperature and for a time sufficient to convert the sodium sesquicarbonate in the crude trona into sodium carbonate and provide anhydrous calcined crude trona, containing a soluble and an insoluble fraction in solid phase therein, introducing the soluble sodium carbonate fraction from said calcined crude trona in solid phase together with the insoluble fraction and an aqueous solvent containing at least 6.2 percent of sodium carbonate previously dissolved therein, into a dissolver, and forming an aqueous solution of the sodium carbonate in the presence of the insoluble solid phase fraction in said dissolver, separating said solution of sodium carbonate from the insoluble solid phase, removing entrained solids from said solution of sodium carbonate to provide a clear solution, evaporating said clear solution and recovering sodium carbonate monohydrate crystals therefrom and calcining said crystals to dense soda ash and recycling the mother liquor from said monohydrate crystals to the evaporators for further monohydrate crystal recovery therefrom, contacting said insoluble solid phase with an aqueous solvent to recover additional sodium carbonate solution therefrom and form an unsaturated solution of sodium carbonate containing at least 6.2 percent of sodium carbonate therein, separating said unsaturated solution from the insoluble phase, and discarding the insoluble phase and recycling said unsaturated sodium carbonate solution recovered from the insoluble phase to the dissolver and dissolving more sodium carbonate therein.

4. The process of claim 2 in which the anhydrous calcined crude trona is contacted initially with an aqueous solution of sodium carbonate containing in excess of 6.2 percent of sodium carbonate therein.

5. Process of preparing soda ash from crude trona having insolubles containing shortite therein, which comprises calcining the crude trona at a temperature and for a time sufficient to convert said crude trona into anhydrous crude sodium carbonate having insolubles therein, introducing the sodium carbonate content of said crude sodium carbonate in solid phase together with said insolubles and an aqueous solvent having in excess of 6.2 percent of sodium carbonate previously dissolved therein into a dissolver and forming an aqueous solution of said sodium carbonate in the presence of said insolubles, separating the said solution of sodium carbonate and the insolubles, recovering sodium carbonate monohydrate crystals from said sodium carbonate solution and calcining to produce soda ash, adding additional water to said insolubles and forming an unsaturated solution of sodium carbonate from the sodium carbonate contained in said insolubles, separating said unsaturated solution from the insolubles and using said unsaturated solution in the dissolving solution in said dissolver.

6. The process of claim 5 in which the crude trona is calcined at a temperature of about 200° C.

7. Process of producing dense soda ash from calcined crude trona which comprises dissolving the sodium carbonate values in calcined crude trona in water containing in excess of 6.2 percent of sodium carbonate dissolved therein to from a substantially saturated solution of sodium carbonate while the insolubles in said calcined crude trona remain suspended in the dissolving solution, separating the insolubles from the dissolved sodium carbonate and recovering sodium carbonate monohydrate crystals from said dissolved sodium carbonate and calcining to produce soda ash, adding makeup water to the insolubles and recovering additional sodium carbonate solution having in excess of 6.2 percent of sodium carbonate therein from the insolubles, separating the insolubles from said additional sodium carbonate solution and using said additional sodium carbonate solution to dissolve the sodium carbonate values in calcined crude trona.

8. Process for producing dense sodium carbonate from crude trona containing insolubles therein which comprises calcining the crude trona to convert the crude trona into crude sodium carbonate containing insolubles therein, dissolving the sodium carbonate values in said crude sodium carbonate in the presence of said insolubles in a countercurrent unsaturated dissolving liquor stream to produce a saturated solution of sodium carbonate containing said insolubles, separating said solution into a saturated stream of sodium carbonate and a stream of insolubles, clarifying said saturated stream of sodium carbonate and evaporating and recovering sodium carbonate monohydrate crystals therefrom and calcining to produce soda ash, recirculating the mother liquor from said sodium carbonate monohydrate crystals to the evaporator circuit to recover more sodium carbonate monohydrate crystals therefrom, flowing said stream of insolubles to a washing and diluting station, diluting and washing said insolubles with fresh incoming water to recover additional sodium carbonate values therefrom and form an unsaturated solution of sodium carbonate, separating said unsaturated solution of sodium carbonate from said insolubles, discarding the insolubles and cycling said unsaturated solution of sodium carbonate countercurrent to the calcined crude sodium carbonate flow to dissolve more sodium carbonate values from said calcined trona therein.

9. The process of claim 8 in which the countercurrent stream of unsaturated sodium carbonate solution used to dissolve sodium carbonate values from said crude sodium carbonate has in excess of 6.2 percent of sodium carbonate dissolved therein.

10. In a process for preparing refined soda ash from crude trona, calcining the crude trona at a temperature and for a time sufficient to convert the crude trona into crude sodium carbonate, mixing the crude sodium carbonate with an aqueous solution of sodium carbonate containing at least 6 percent sodium carbonate to form a substantially saturated solution of sodium carbonate, separating the saturated solution of sodium carbonate from the gangue solids, removing slimes from said saturated solution of sodium carbonate, evaporating said saturated solution to crystallize sodium carbonate crystals therefrom, separating the sodium carbonate crystals from the mother liquor and calcining to produce soda ash and recycling the mother liquor to the evaporator circuit.

11. The process of claim 10 in which the calcining temperature is between about 150° C. and about 800° C.

12. The process of claim 10 in which there is provided a multiple effect evaporating circuit for said evaporation of said saturated solution to crystallize sodium carbonate crystals therefrom and in which mother liquor from said sodium carbonate crystals is recycled to an evaporator for further evaporation of mother liquor for the recovery of further sodium carbonate crystals therefrom.

13. The process of claim 12 in which the evaporator to which the mother liquor from the sodium carbonate crystals is recycled is a single effect evaporator.

14. The process of claim 10 in which there is provided a multiple effect evaporating circuit for said evaporation of said saturated solution to crystallize sodium carbonate crystals therefrom and in which mother liquor from said sodium carbonate crystals is recycled to an evaporator in which all further evaporation of said recycled mother liquor for recovery of additional sodium carbonate crystals therefrom occurs.

15. The process of claim 14 in which there is separation of the sodium carbonate crystals from recycled mother liquor in mixture with the sodium carbonate crystals and mother liquor from the remainder of the said evaporating circuit.

* * * * *